United States Patent

[11] 3,556,161

[72] Inventor Robert Roberts
Palmyra, N.Y.
[21] Appl. No. 483,875
[22] Filed Aug. 30, 1965
Continuation-in-part of application Ser. No. 94,129, Mar. 8, 1961, abandoned and Ser. No. 209,759, July 13, 1962, abandoned.
[45] Patented Jan. 19, 1971
[73] Assignee E. I. du Pont de Nemours and Company
Wilmington, Del.
a corporation of Delaware

[54] STRUCTURES OF POLYTETRAFLUOROETHYLENE RESINS AND THEIR MANUFACTURE
34 Claims, No Drawings

[52] U.S. Cl. .................................................. 138/141,
161/159, 161/168; 260/2.5; 264/49, 264/127, 264/175
[51] Int. Cl. ............................................... B29d 27/00;
F16l 9/12
[50] Field of Search .......................................... 161/159,
168, 189, 254, 411(Teflon, Strotch, Porous Blk);
156/307, 333; 264/53, 54, 127, 288, 86, 108, 294, 119, 289, 291, 320, 175; 138/141; 260/92.1, 41, 2.5

[56] References Cited
UNITED STATES PATENTS
3,281,511 10/1966 Goldsmith ..................... 264/49

Primary Examiner—Philip E. Anderson
Attorney—Samuel S. Blight

ABSTRACT: A sheet comprising per 100 parts by volume 0—39 parts liquid capable of wetting polytetrafluoroethylene and 61—100 parts complementally of solid material comprising 5—100 volume percent polytetrafluoroethylene resin and 0—95 volume percent complementally of particulate solid filler, said sheet having a volume shrinkage of less than 39 percent on drying and heat-treating, further characterized in that the polytetrafluoroethylene resin is present substantially entirely in the form of discrete lamellae less than 10 microns thick, which lamellae are molecularly oriented parallel to the faces of said structure and have a molecular orientation as determined by an A X-ray ratio of from 1 to 0.4 and a B X-ray ratio of from 0.7 to 0.05.

STRUCTURES OF POLYTETRAFLUOROETHYLENE RESINS AND THEIR MANUFACTURE

This application is a continuation-in-part of my copending applications Ser. No. 94,129, filed Mar. 8, 1961, and Ser. No. 209,759, filed Jul. 13, 1962 and both now abandoned.

This application relates to formed structures of polytetrafluoroethylene resin, and more particularly, to formed structures of polytetrafluoroethylene resin having planar orientation and a resulting high tensile strength.

The formed structures of the present invention are prepared by a process which has come to be known as the "slip-forming" process. The slip-forming process comprises mixing polytetrafluoroethylene fine powder with a liquid and then sequentially working the resulting composition by the application of concurrent compressive stress and shear stress, the sequence of operations being directed so that the shear stress components are distributed substantially biaxially, resulting in planar orientation in the resulting article. During this working process, the thickness of the mass should be reduced at least threefold, and preferably sixfold, while maintaining the composition in a slip-formable condition. Initially the mass to be slip-formed requires a liquid/resin ratio of 0.65 or more, but the working modifies the character of the resin particles, liquid being expelled from the mass, and after substantial working, the mass may be maintained with liquid/resin ratios as low as 0.4.

Polytetrafluoroethylene fine powders consist of substantially spheroidal aggregates of ultimate, substantially spherical, particles of polytetrafluoroethylene, the aggregates having a diameter of 5 to 700 microns. The ultimate colloidal particles, of which the aggregates are composed, have a diameter between about 0.05 and 5 microns.

Examination of a slip-formed sheet with an electron microscope shows that the shape of the ultimate colloidal particles is essentially unchanged by the slip-forming process. The aggregates, however, are transformed to coherent lamellae of indefinite extent, but generally having a thickness less than 10 microns. The polytetrafluoroethylene resin structures of the present invention exhibit planar orientation in that the molecular chain axes lie approximately parallel to the surface of the resin structure although said axes are at random within this plane. The degree of this orientation can be determined by obtaining the X-ray ratios A and B of the finished product or by a study of the tensile properties resulting from the orientation. This unique orientation is retained upon drying the structures and subjecting them to a heat treatment above the melting point of the polytetrafluoroethylene resin, i.e., above about 320 to 327° C.

The mechanical and other properties of slip-formed sheeting are remarkable. The "green," or unheated treated structures, are surprisingly strong, yet may be inelastically extended 500 percent or more, then dried and heat-treated with little tendency to exhibit the phenomenon of memory. Thus, green sheeting may be fabricated by techniques such as blowing, vacuum forming and the like. The green sheets, preferably unheated, may be laminated and the laminate healed to a coherent structure, thus providing means for fabrication of nonuniform articles. Upon heat treating, as aforesaid, the structures manifest molecular orientation, and tensile strengths exceeding 5,000 p.s.i., a value in excess of previously known polytetrafluoroethylene resin structures, fabricated from polytetrafluoroethylene fine powders.

A further remarkable feature of this process is that extremely large amounts of fillers may be incorporated in slip-formed sheets. Concentrations of fillers up to 95 percent by volume may be incorporated without destroying the character of the composition or interfering with the formation of slip-formed sheets. This property is especially remarkable since pressure-coalescible polytetrafluoroethylene resin compositions have been known in the art for extrusion purposes, i.e. the paste extrusion process, but such compositions are difficult to extrude in the presence of as little as 5 percent by volume of filling materials, and at concentrations of 10 percent are substantially impossible to extrude.

It has now been discovered that under certain critical conditions, it is possible substantially to remove fillers, or in cases where mixed fillers are employed to selectively remove one filler, whereby porous sheets of polytetrafluoroethylene resin having planar orientation, with or without fillers, may be manufactured. These structures manifest extraordinary strength; indeed, under the optimum conditions, the tensile strength divided by the fraction of solid resin present in sintered porous structures is substantially that of nonporous, slip-formed sintered sheeting, i.e. in excess of 5000 p.s.i.

Two processes by which the aforesaid sheeting may be made can be distinguished. It has been found that filler particles having a least dimension of 20 microns or less are substantially encapsulated between the lamellae of polytetrafluoroethylene resin, and consequently, relatively inaccessible to leaching agents. Accordingly, in the first process, removable filler particles having a least particle dimension greater than 20 microns are employed. Electron microscopic observation of slip-formed sheets incorporating such particles has shown that the particles penetrate the lamellae, the particles being traversed by bands or webs of polytetrafluoroethylene resin which, while rendering the particles accessible to leaching agents, or removable by chemical action without deformation of the structure, nevertheless contribute markedly to the unusual and unexpected tensile strengths encountered in these porous structures.

The removable fillers may be broadly classified according to their mode of removal.

1. Fillers removable by solvent action without change of chemical composition. Included among such fillers is sodium chloride, which is preferred, as it is water-soluble, nonhygroscopic, chemically stable under the processing conditions, and inexpensive. Many other similar salts and the like may be employed in the process of this invention as will be apparent to those skilled in the art.

2. Fillers which may be dissolved by chemical action. Examples of such fillers are metal powders such as iron powder, which may be removed by the action of hydrochloric acid and aluminum powder which can be removed by the action of caustic alkalies such as sodium hydroxide.

3. Fillers which decompose to volatile components on heating to temperatures below about 400° C. Included are such fillers as ammonium chloride and ammonium carbonate, and polymers such as polymethylmethacrylate which undergo thermal depolymerization reactions to give the corresponding monomer at relatively low temperatures.

It will be apparent that the well-known extreme resistance of polytetrafluoroethylene to all known solvents to high temperatures, and to virtually all known chemical agents, including strong acids such as hydrofluoric acid, hydrochloric acid, hydrobromic acid, hydroiodic acid, sulfuric acid, perchloric acid, strong alkalies such as sodium hydroxide, potassium hydroxide and the like, render possible an extremely wide range of processes for the removal of fillers by chemical action.

The aforesaid classes of removable fillers are by no means exclusive, and in many instances mixed modes of removal may be employed. For example, salts containing water of hydration such as sodium sulfate may be employed as fillers. Such compounds are partly removed by the loss of water on sintering, and partly by solution of the residual salt by water. Another instance of mixed action is by the catalytic decomposition of a polymeric filler, e.g. an acetal resin, the decomposition of which may be accelerated by the action of acidic substances.

The aforesaid processes are characterized by the removal of the fillers without substantial disturbance of the tetrafluoroethylene resin structures, the porosity and physical dimensions of which may thereby be closely controlled. Furthermore, the fillers may be removed before or after heat treating. If the ultimate object is to be heat-treated, then it is highly desirable to remove the removable filler after heat treating, since the heat treating process tends to close the pores of the porous structure, thereby obviating to some extent the desired result.

Another distinct process may also be employed for the manufacture of the porous, planar oriented structure of this invention. According to this process, a thermally decomposable filler having a article size substantially less than 20 microns is employed as a filler in the slip-forming process. The particles of such fillers are encapsulated between the slip-formed lamellae. Upon heating the aforesaid composition above the melting temperature of the resin, a blowing action takes place ultimately rupturing the lamellae and thereby facilitating the removal of the encapsulated filler. The fillers which may be employed in this process are particulate fillers which thermally decompose on heating at temperatures below about 400° C., i.e. those filler materials of class 3 of the process described hereinabove which are distinguished in this modification solely by particle dimensions. It is therefore evident that when fillers having a wide particle size range are employed, porous structures will be fabricated according to both mechanisms. It will also be evident that this process may be applied with partially decomposable fillers such as the hydrates of soluble inorganic salts. In one preferred embodiment of this process, for example, borax (sodium borate decahydrate) in the form of crystalline particles having a diameter of about 1 micron is employed as a blowing agent.

The process in which decomposable particles are encapsulated within the slip-formed tetrafluoroethylene resin is distinguished from the process wherein the particles are removed without disturbing the physical structure of the resin, by a substantial expansion in the volume of the slip-formed sheet upon heat treating at the melting temperature of the resin.

With regard to the concentration of the filler particles which may be employed in this invention, this is dependent upon whether or not the structure is to be sintered, upon the size of the particles, and the thickness of the formed sheet from which the particles are to be removed.

Generally speaking, a minimum concentration of about 20 percent by volume of the total solids of the removable filler is required in order to obtain substantially complete removal by decomposition or solvation as the case may be, where the structure is to be heat-treated prior to or concurrent with the removal step. With fillers having large particle size, and where relatively thin sheets are desired, a concentration of removable fillers, as low as 10 percent by volume of the total solids, may be employed. Where the removable filler is to be removed from the unsintered sheet, substantially lesser concentrations, down to about 5 percent by volume of the total solids, may be employed.

It will be apparent to those skilled in the art that the aforesaid minimum concentrations do not represent highly critical limitations, but rather represent limitations based on practical considerations. Generally, the degree of porosity desired requires filler concentrations far exceeding the lower limits.

In order to operate the slip-forming process, it is essential that at least 5 percent by volume of the total solids consists of the porous aggregates of polytetrafluoroethylene resins having a particle size preferably of about 10 microns. However, additional quantities of tetrafluoroethylene which in themselves are not amenable to slip-forming may also be present, e.g. polytetrafluoroethylene granular powder or polytetrafluoroethylene microfilms made by pulverizing paste extruded polytetrafluoroethylene compositions.

With regard to the maximum concentration of removable filler which may be employed, and hence the degree of porosity which may be obtained, this is determined by the maximum concentration of fillers which may be incorporated with the resins to obtain a composition amenable to the slip-forming process. The absolute maximum is thus dependent to some degree on the exact nature of the porous aggregates of ultimate tetrafluoroethylene particles which are an essential component of the composition and to a lesser extent on the liquid employed. Generally speaking, about 95 percent by volume of the total solids in the composition may consist of fillers including removable and nonremovable fillers. Preferably, the combined volume of fillers should not exceed 90 percent by volume of the total solids volume.

In many instances, two or more fillers may be incorporated in the composition, and one removed selectively whereby a porous filled composition may be obtained. The distinctions between removable and nonremovable fillers depends upon the mode of treatment of the slip-formed compositions, i.e. whether the fabrication is conducted exclusively at low temperatures without sintering, or whether the material is sintered at high temperatures thereby eliminating or chemically modifying temperature-sensitive fillers, and upon the chemical agents or solvents which may be employed to extract or otherwise remove the removable filler. Included in the fillers which may be usefully incorporated in the porous structures are pigments such as the Monastral pigments, carbon black, graphite, titanium dioxide, zirconia, alumina, barium sulfate, calcium carbonate, etc. Metal powders such as aluminum powder, bronze powder, iron powder, copper powder, zirconium powder, titanium powder, and the like may be incorporated to impart color, thermal conductivity, electrical conductivity and the like. Finely divided metals such as platinum, palladium, osmium, nickel, cobalt and the like or metal oxides may be incorporated in the porous structures to provide catalysts. Abrasives such as silicon carbide, aluminum oxide, jeweler's rouge, pumice and the like may be employed. Organic and inorganic polymers such as polyolefins including chlorinated and fluorinated compositions, acetal resins, polyamides, polyimides, polycarbonates, epoxy resins, silicone resins and the like may be used. Fillers having a lubricating and stiffening function such as molybdenum sulfide, graphite and the like. Fibrous fillers such as glass fibers, asbestos, potassium titanate and the like may likewise be added. Platelike materials such as mica may be incorporated.

It will be noted that by contrast with the removable fillers no critical size limitation exists with respect to the particle size of a selected nonremovable filler. Likewise the physical form of the filler is not material: the filler may be in the form of discrete granules, platelets, films and the like.

In some instances, the function of removable and nonremovable fillers may be combined, For example, highly porous particles of silica, having a particle size substantially less than one micron may be incorporated with the pressure-coalescible tetrafluoroethylene resin. Upon processing and subsequent heat treating, the air entrapped in the encapsulated particles perform a blowing function creating a porous structure while the silica particles remain as a filler.

It will be obvious that in instances where the porosity of a sheet is not desired, either the filler, if used, would not be removed or else no filler would be incorporated in the composition.

Compositions of polytetrafluoroethylene resin suitable for the present invention and methods of preparing them are disclosed for example in Holbrook, U.S. Pat. No. 2,510,112, issued June 6, 1950; Llewellyn, U.S. Pat. No. 2,587,357, issued Feb. 19, 1952; Lontz et al. U.S. Pat. No. 2,593,582, issued Apr. 22, 1952; Lontz U.S. Pat. No. 2,630,417, issued Mar. 3, 1953; Llewellyn et al. U.S. Pat. No. 2,685,707, issued Aug. 10, 1954; and British Specification 829,503, sealed June 22, 1960. Such compositions comprise tetrafluoroethylene resin, having a crystalline melting point above 320° C., preferably 325 to 327°., in the form of generally spheroidal porous aggregates, 5 to 700 microns in diameter, of generally spheroidal colloidal resin particles 0.05 to 0.5 micron in diameter. Resins of this kind are commercially available as tetrafluoroethylene resin "fine powders." Pressure-coalescible tetrafluoroethylene resin compositions also comprise a liquid lubricating capable of wetting the perfluorocarbon resin, desirably forming a contact angle of less than 90° and preferably less than 45° with a smooth tetrafluoroethylene resin surface. Preferably the lubricants have a viscosity in the range of 0.4 to 1,000 centipoises at room temperature although liquids of higher or lower viscosity can be used. Relatively volatile hydrocarbon liquids such as refined kerosene are generally preferred for reasons of economy in circumstances where it is desired to remove lubricant by volatilization before heat treating. Less volatile lubricants may also be used and extracted with more volatile liquids if desired, or left in place if the composition is to be used as a fuel or put to other use where removal of lubricant is unnecessary. Unsaturated monomers or monomer-polymer syrups which may be polymerized in situ after shaping to provide unsintered articles having increased stiffness or resiliency may also be used.

The amount of liquid needed to form a pressure-coalescible composition capable of being worked in accordance with the present invention depends to some extent upon the nature of the resin, but more importantly upon the quantity of the filler, if a filler is desired, and its physical character. As a rough approximation, the liquid may be divided into two quantities, one quantity associated with the resin and one quantity associated with the filler, which may be considered to substantially be independent of each other.

With respect to the polytetrafluoroethylene resin, the amount of liquid needed varies with the size and porosity of the discrete, solid particles. Commercial polytetrafluoroethylene resin fine powders comprise discrete, porous aggregates averaging about 300 microns in diameter and usually require 3 to 6 volumes of liquid for displacement volume of resin to form a pressure-coalescible composition without deforming the aggregates. As the aggregates are compacted, the amount needed decreases until, at a liquid/resin volume ratio of slightly less than 0.4, it is difficult to maintain this condition. Unless compaction is carried out at the above liquid/solid ratio, the aggregates agglomerate to form increasingly larger particles as the compaction proceeds and the structure becomes increasingly fragile as compared to structures equally compacted under the above conditions.

In the preferred practice of this invention, to obtain maximum cohesive strength, an uncompacted polytetrafluoroethylene fine powder is first slurried in 20 to 40 volumes of resin wetting liquid and subjected to the cutting action of a high speed, bladed-rotary stirrer at temperatures in the range of 0 to 60° C. to produce discrete, generally spheroidal, particles averaging 10 microns or less in diameter. Cutting temperatures below 19° C. are preferred in order to minimize smearing. The particulate fillers are desirably included in the slurry prior to the termination of the cutting process to facilitate uniform distribution. Alternatively, small aggregates may be obtained by commencing with an aqueous colloidal dispersion of polytetrafluoroethylene resin, admixing a water-immiscible liquid, such as carbon tetrachloride, adding an electrolyte such as hydrochloric acid, stirring until the resin is transferred into the nonaqueous liquid, and decanting the aqueous phase.

The amount of liquid associated with the filler portion of the solids may be roughly determined by slurrying the particulate filler with the selected liquid, filtering to dryness and determining the amount of liquid left on the cake by weighing, extraction or the like.

Regardless of the exact amount of liquid employed, an essential requirement is that the initial composition, prior to the compressive shear processing steps contains sufficient liquid to be slip-formable in character. Departure from these conditions is generally indicated by a change in the appearance of the mixture generally a lightening of the color, and by the development of minute fissures in the surface of the mass. If such departure from these conditions is noted, they may be restored by the addition of further quantities of the resin-wetting liquid.

The degree of working which is required in order to attain the physical change in the polytetrafluoroethylene resin aggregates, and the attendant properties may be determined in a variety of ways.

1. The change may be determined by the loss of the resin-wetting liquid from the mass. This method is particularly valuable where the slip-forming process is performed in the absence of fillers, or when small amounts of fillers are employed. The liquid expressed should reflect a change in the liquid/resin ratio, excluding the liquid associated with the filler, of from about 0.75 to below 0.65.

2. The effect of the processing may be determined by the molecular orientation of the resin as determined by the X-ray ratios A and B of the finished product. This method has the advantage that it is not affected by the presence of fillers, except in the case where the X-ray diffraction of the fillers is superposed on the diffraction from the polytetrafluoroethylene resin. In that event, the filler may be removed by leaching from the test specimen.

The A ratio is determined by cutting a disc-shaped sample from the sheet to be tested and mounting this in an X-ray diffraction apparatus normal to the pinhole collinated beam of X-rays. The transmitted beam is recorded on a flat plate film also mounted normal to the X-ray beam, i.e. parallel to the sample. The intensity of the (100) Debye-Sherrer ring, which occurs at a Bragg-plane spacing of 4.9 A. (25° C.) is measured as a function of position on the circumference of the Debye-Sherrer ring. At the position of maximum and minimum intensity, a radial intensity scan is made across the Debye-Sherrer ring traversing a sufficiently large distance on either side of the Bragg angle defining the ring to determine accurately the underlying background. If CuK$\alpha$ radiation is employed, this angle should be no less than 2° on either side of the ring and preferably 5° on either side of the ring. The areas of the (100) crystalline peak above the diffuse background are compared to obtain a minimum to maximum ratio, herein referred to as the A ratio.

The same is then sectioned in a direction perpendicular to a line drawn through the maxima of the (100) Debye-Sherrer ring, and the procedures detailed hereinabove are repeated to determine an X-ray ratio for the sample in a direction perpendicular to the direction employed for the A ratio (i.e. the X-ray beam is parallel to the plane of the sheet). This ratio is referred to as the B ratio.

The A and B ratios are preferably determined on sheets which have not been heat-treated and from which interfering fillers have been substantially removed by leaching. In this condition, the polytetrafluoroethylene resin is highly crystalline as determined by X-ray diffraction, and relatively little diffuse background scattering is encountered. The A and B ratios, however, may be determined for heat-treated structures. Heat treating partially destroys the crystallinity of the sample and (100) ring is correspondingly weaker for given conditions of determination. At the same time the diffuse background, which in part may be attributed to noncrystalline polytetrafluoroethylene resin, is increased.

The procedure described hereinabove refers to a photographic method for the determination of the A and B ratios. It will be apparent to those skilled in the art of X-ray diffractometry that the photographic plate may be replaced by a scanning device, equipped with a Geiger-Muller counter or a Scintillation counter, whereby the intensity of the scattered radiation by the sample may be determined directly.

Successful slip-forming of pressure-coalescible compositions of polytetrafluoroethylene resin with or without fillers is indicated by an A ratio between 1 and 0.4, and preferably between 1 and 0.6, and by a B ratio between 0.7 and 0.05, and preferably between 0.65 and 0.2.

By contrast, paste extruded tapes generally have an A ratio between 0 and 0.4 and a B ratio between 0.8 and 1.

3. A third method of determining the degree of working is by determining the total change in physical dimensions of the mass, taking into account lamination. Generally speaking with filled structures, the ratio of initial to final thickness should be between 5 and 15, and preferably from 10 to 14. The relative changes in dimensions in mutually perpendicular directions in the plane of the sheet should have a maximum to minimum ratio of about .04 to 1, and preferably 0.75 to 1.

The fabrication step may be conducted over a wide range of temperatures below the crystalline melting point of polytetrafluoroethylene. However, at temperatures below 19° C., the pressure-coalescibility of the compositions tends to be diminished. Generally, it is preferred to conduct the shaping operation at 20° to 40° C. Unless very high shear stresses are encountered in the shaping operation.

After mechanically working the mass to a sheet form according to the foregoing description, it is generally preferred to free the sheet from solvent by drying in an air oven at a temperature below the crystalline melting point of tetrafluoroethylene resins, and preferably below 250° C., or in the case of less volatile liquid media by extraction with a volatile extractant such as carbon tetrachloride, acetone, alcohol or the like, and then removal of the volatile extractant remaining in the composition by heating to an elevated temperature not exceeding the crystalline melting point of the polytetrafluoroethylene resin, preferably in an air oven providing for free circulation of the air or like gas, or in vacuum.

After drying, the slip-formed sheet may then be heat-treated by heating for a short time above the crystalline melting point of the polytetrafluoroethylene resin. The time of heat treating depends on the temperature selected and on the thickness of the sample. Preferably, a temperature above 340° C. is employed for the minimum time needed to attain the maximum strength, and, in the case of fillers removed by volatilization or decomposition to gaseous products for the time required to remove the said fillers. With respect to the polytetrafluoroethylene resins, the time needed to obtain a satisfactorily heat-treated structure is 10 to 30 minutes at 360 to 390° C., and even shorter times, down to 0.5 minute at higher temperatures and with very thin structures, may be employed. The aforesaid times may be increased when it is necessary to volatilize a filler, conversely the necessary time may be decreased by fillers such as metal powders which assist the conduction of heat to the interior of the structures.

The tensile strength of porous structures of polytetrafluoroethylene resins made according to this invention is indeed surprising. In view of the obvious fact that many contacts between the resin are prevented by the presence of the voids, it would be expected that such structures would be relatively weak. In fact, in many instances, the tensile strength, based on total cross section and corrected for the percentage of voids in the structure, is as great as the tensile strength of nonporous slip-formed structures of polytetrafluoroethylene resins. Thus, in compositions containing 80 percent voids, tensile strengths as high as 1,100 p.s.i. have been found. The corresponding void-free compositions of polytetrafluoroethylene have tensile strengths of about 5,000 to 6,000 p.s.i., the ratio of tensile strength in the structures being approximately equal to the proportion of tetrafluoroethylene in the porous structure. This surprising strength suggests that the incorporation of large filler particles assists the mechanical deformation of the polytetrafluoroethylene resin aggregates in the slip-forming procedure.

Further evidence for the mechanical coaction of filler particles with the polytetrafluoroethylene resin is provided by the fact that the tensile strength of porous compositions, deformed about 5 times in thickness during the fabrication, is relatively low (c. 200 p.s.i.), but rapidly increases to values of 1,000 p.s.i. or more for samples deformed about 14 times during fabrication. These, and like results, indicate that the effects of the filler in enhancing the tensile strength of the slip-formed sheet is realized only at relatively high levels of working, i.e. when lamellae in close propinquity have been formed. Accordingly, it is believed that the large particles tend to stretch the lamellae inducing a further strengthening due to molecular orientation.

The structures made according to the invention have a leatherlike feel and an attractive appearance. In the light of this strength, controlled porosity, extreme chemical resistance and the like, they are exceedingly useful in a wide variety of applications, as will be apparent to those skilled in the art. Included in such uses are: filtering media for use with highly corrosive chemicals, battery separators, separators for fuel cells and the like. They are also useful for chemically inert supports for catalysts, ion exchange resins, electrode materials and the like. They may be employed as bandages, inserts and like in medicine. In the electrical industry, they provide novel insulating and cushioning material, either alone or impregnated with liquid dielectric media. The structures may be readily printed with ordinary or metallic inks and thus are useful for fire and weather-resistant documents or the like.

These structures may be fabricated to larger and more complex structures during the course of manufacture, as has been described hereinabove by laminations, stretching and the like. After fabrication and heat treating, they may be united with like structures, metals, plastics, wood, ceramics and the like with conventional cements, including epoxy resins and fusible thermoplastics. In the class of fusible thermoplastics, noteworthy members are the fusible polytetrafluoroethylene-hexafluoropropylene copolymers and polytetrafluoroethylene resin structures.

The invention is further illustrated by the following examples which should not, however, be construed as limiting the scope thereof.

EXAMPLE I

A commercial tetrafluoroethylene resin fine powder comprising discrete spheroidal aggregates averaging about 300 microns in diameter is slurried in 20 times its displacement volume of refined kerosene, and subjected to cutting at room temperature for 1 minute with a bladed rotary cutter, the blades operating at a peripheral speed of about 2,000 feet per minute to reduce the average size of the discrete aggregates to about 10 microns. The cut slurry is placed on a suction filter, covered with a flexible rubber sheet, and compacted to remove lubricant under suction leaving a pressure-coalescible filter cake in which the liquid-resin volume ratio is about 0.8. The cake is placed on a flat metal surface and rolled out monoaxially into an oblong sheet about 60 mils thick, using a cylindrical metal roller supported above and parallel to the flat surface on two sets of 12 superposed metal shims, each 5 mils thick. After this rolling, one half of the oblong sheet is picked up gently and laid congruently over the other half to obtain a two-layer laminate with the two halves of the original long axial of the sheet coinciding. The laminate is then picked up, rotated 90° in the horizontal plane, replaced on the flat metal surface, and rolled out again to 60 mil thickness in the same manner as before. The successive doubling, rotating and rolling out steps are then repeated several times, removing one 5 mil shim from each set of roll supports after each rolling, until a sheet about 25 mils in thickness is obtained. During the course of this slip-forming operation, kerosene is squeezed from the surfaces of the sheet being formed, until the liquid/resin volume ratio within the sheet is about 0.64, exhibiting a uniformly grayish surface with no visible fissures.

The following operations and tests are carried out on sheets prepared by the foregoing procedure:

a. The sheet is heated gently to remove kerosene and heat-treated by heating for 20 minutes at 380° C. and cooling in air to room temperature. The sheet shrinks less than 35 percent in volume, the ratio of length to width remains substantially constant and a substantially void-free structure is obtained. Via ASTM D- 1457 - 56T the heat-treated sheet has a tensile strength at break of about 6,000 pounds per square inch in both the length and width directions, and an elongation at break of about 500 percent. In this test the stress needed to continue elongation progressively increases, so that a definite yield strength value cannot be obtained. On further heating for 20 minutes at 380° C. the sheet shows very little dimensional change, and a slight decrease in tensile values.

b. The sheet is drawn 500 percent in length and width without developing flaws or fissures. It is also drawn successively, in steps at right angled directions to a flawless film less than 1 mil thick. It is also rolled out, in steps at right angled directions, while keeping a film of liquid on the surface to maintain the condition, into a flawless film less than 1 mil thick. In these drawing and rolling operations the sheet exhibits slight elasticity, recovering about 5 percent of the induced elongation when the elongating tension is released. Results similar to those of paragraph a. are obtained on drying and heat treating as in paragraph a.

c. The sheet is placed over a vented hemispherical cavity and conformed to the cavity under fluid pressure applied through a rubber dam. The pressure is applied several times to substantially eliminate elastic recovery. The molded preform is dried and heat-treated 30 minutes at 380° C. to provide a flawless hemisphere. The heat-treated article shows tensile properties similar to those of paragraph a.

d. The sheet is laid over a 4 inch square of 16 × 20 mesh screen woven of 0.025 inch diameter copper wire, and rolled into the interstices thereof. Upon drying and heat treating 30 minutes at 380° C. a flawless reinforced article is obtained.

e. On rapid heating of the sheet to 380° C. without previous drying to remove lubricant, lamellae 5 microns or less in thickness separate at the surface of the sheet. In a sheet identically prepared except that the solids included two percent carbon black, microscopic examination of frozen microtomed cross sections of the hydrostatic sheet at 400 diameters magnification show the lamellae to be discrete, about 1—5 micron thick, with lateral dimensions several times as large, disposed in planes parallel to the surfaces of the sheet, there being no visible spheroidal particles. Examination of the same cross sections under the electron microscope at 10,000 diameters magnification shows that the ultimate colloidal particles, averaging 0.1 to 0.3 microns in diameter, are uniformly packed in almost contiguous propinquity.

f. A disc cut from the sheet is examined by an X-ray diffraction technique in which a pinhole-collimated circular X-ray beam is directed normal to the flat sheet surface. The transmitted beam is recorded on a flat plate film also mounted normal to the flat sheet surface. The intensity of the (100) Debye-Scherrer ring, which occurs at a Bragg plane spacing of about 4.9 Angstroms (25° C.), is measured as a function of position on the circumference of the Debye-Scherrer ring. At the positions of maximum and minimum intensity a radial intensity scan is made across the Debye-Scherrer ring traversing a distance corresponding to all angles within 5° of the Bragg angle defining the ring. The areas of the (100) crystalline peaks above the diffuse backgrounds in each position are compared to obtain a minimum to maximum ratio of approximately 1, indicating that molecular orientation is substantially uniform in all directions parallel to the flat surfaces of the disc.

A rectangular segment 25 mils wide is then cut from the disc and examined by a similar technique except that in this instance the X-ray beam enters a cut edge, traverses the width, and exits through the opposite cut edge. In this instance maximum intensities are observed in directions normal to the uncut surfaces, and minimum intensities are observed in directions parallel to the uncut surfaces at a minimum to maximum ratio of about 0.4, indicating molecular orientation in the plane parallel to the flat surfaces of the structure.

EXAMPLE II

Commercial tetrafluoroethylene fine powder of the kind described in example I and refined kerosene are tumbled together in a cylindrical vessel to obtain a uniform blend of 60 parts tetrafluoroethylene resin and 40 parts kerosene. The resulting blend is compacted under 200 p.s.i. pressure to obtain a pressure-coalescible composition in the form of a hollow cylinder 3.23 inches in diameter having a concentric 0.77 inch bore. The hollow cylinder is charged to a cylindrical extruder barrel 3.25 inches in diameter having a concentric mandrel 0.725 inches in diameter extending through the barrel and an attached tubing die, which tapers at an apex angle of 30° to a cylindrical orifice 0.883 inches in diameter and 8 inches long. The composition is extruded at the rate of about 12 inches per minute into tubing having a wall thickness of about 0.080 inch and an external diameter of about 0.88 inch, the liquid/resin volume ratio being substantially unchanged in the course of the extrusion. For contrast with results below, a sample of this extrudate when dried and heat-treated 30 minutes at 380° C. shows a tensile strength of about 4,500 p.s.i. in the machine (extrusion) direction and about 3,200 p.s.i. in the transverse (hoop) direction.

A further segment of the tube is rolled out to an external diameter of 4.14 inches in a series of rolling operations similar to those of example I, except that in this instance a metal cylinder 0.05 inches in diameter is used to effect the rolling out, and all of the rolling is done in the transverse (hoop) direction. During the course of the rolling, liquid is expressed from the tube, until the liquid/resin volume ratio is about 0.64. On drying and sintering the rolled out segment 10 minutes at 380° C., there is obtained a substantially void-free product which has a tensile strength of about 5,600 p.s.i. in both the longitudinal and transverse (hoop) directions, and other properties similarly approximating those described in the lettered paragraphs of example I as measured on samples cut from the tubing walls and gently flattened out. The lamellae in this instance are less than about 10 microns thick, and of substantially larger average diameter than those of example I.

EXAMPLE III

A pressure-coalescible composition is prepared by the procedures of example I except that the initial slurry comprises 40 parts of resin powder, 30 parts of aluminum powder, and 30 parts of powdered potassium chloride in 2,000 parts kerosene. The composition is slip-formed into a 25 mil thick sheet by the procedure of example I. Sheets so obtained are rolled up under slight tension to form a solid cylinder 5 inches in diameter, the sheets being warmed to successively volatilize most of the liquid as the rolling up proceeds. The resulting cylinder is highly uniform and visually flawless. A segment cut from the resulting massive article has a tensile strength of over 100 p.s.i. Similar compositions having excellent combustibility properties are obtained by utilizing Thermit process components as fillers instead of aluminum powder and potassium chloride

EXAMPLE IV

The formulating and slip-forming procedure of this example is carried out under an atmosphere of nitrogen. One part of commercial tetrafluoroethylene fine powder is slurried with 20 parts of liquid 1, 1, 7-trihydrododecafluoroheptyl methacrylate containing 0.05 parts N,N'-dimethyl-p-toluidine and 0.05 parts benzoyl peroxide. Excess liquid is filtered off to obtain a composition comprising about one part resin and 2.3 parts liquid, and slip-formed to a 25 mil thick sheet by the procedure of example I. Successive layers of the sheet are laid over a vented conical cavity having a rounded bottom and deformed under fluid pressure as in example I to fit snugly against the walls of the cavity, until a 0.25 inch thick lining is obtained. The resulting laminate is cured for 24 hours in the cavity to polymerize the residual liquid in situ. The resulting product is extremely tough, and has uniformly excellent shock resisting and electrical properties.

EXAMPLE V

Two volumes of a commercial polytetrafluoroethylene resin fine powder comprising discrete spheroidal aggregates averaging about 300 microns in diameter and 8 volumes of powdered sodium chloride, passing through a 50 mesh ASTM, standard sieve, is slurried in 10 times it its displacement volume of refined kerosene, and subjected to cutting at room temperature for one minute with a bladed rotary cutter; the blades operating at a peripheral speed of about 2,000 feet per minute to reduce the average size of the discrete polytetrafluoroethylene aggregates to about 10 microns and the average size of the sodium chloride powder to about 100 microns. The cut slurry is placed on a square suction filter, covered with a flexible rubber sheet, and compacted to remove lubricant under suction leaving a pressure-coalescible filter cake in which the liquid/solids volume ratio is about 0.3. The square cake, approximately 120 mils thick, calendered between dual, even-speed, calender rolls, set 45 mils apart and rotating at 2 r.p.m., into an oblong sheet about 45 mils thick. After calendering, one-half of the oblong sheet is picked up gently and laid congruently over the other half to obtain a two-layered laminate with the two halves of the original long axis of the sheet coinciding. The laminate is then picked up, rotated 90° in the horizontal plane, and calendered (directed 90° to the original direction of calendering) again at the 45 mil roll separation in the same manner as before. The successive doubling, rotating and calendering steps are then repeated so that the composition had been rolled a total of six times. During the course of this slip-forming operation, kerosene is squeezed from the surfaces of the sheet begin formed until after 6 passes through the calenderer, the liquid/solids volume ratio within the sheet is about 0.25, exhibiting a uniformly grayish surface with no visible fissures.

The following operations and tests are carried out on slip-formed sodium chloride filled sheets prepared by the foregoing procedure:

a. The sheet is heated gently to remove kerosene and free-sintered by heating for 15 minutes at 380° C. and cooling in air to room temperature. The sheet shrinks less than 35 percent in volume, the ratio of length to width remains substantially constant and a substantially void-free sodium chloride filled biaxially oriented structure is obtained. The uniformly dispersed sodium chloride particles are leached from the sintered sheet by immersion and washing in water until the wash water is free of dissolved salt, indicated by testing the wash water with silver nitrate solution until no silver chloride precipitate is detected therein. The sheet is then dried at 120° C. for one hour to remove residual water. Removal of the salt is confirmed by inspecting microtomed sections of the porous structure with a microscope fitted with polarizing optics. Air permeability tests on the porous interconnecting structure containing by volume of process 80 percent by volume of process shows an air flow of 0.24 cubic feet a minute per square foot at 0.1 p.s.i.g. pressure and 1.2 cubic feet a minute at 5.0 p.s.i.g. pressure. The sintered sheet has a tensile strength at break of about 200 p.s.i. in both the length and width directions and an elongation at break of about 200 percent as determined by ASTM-D- 1456-56T. In this test, the stress needed to continue elongation increases so that a definite yield strength cannot be obtained.

Microscopic examination of sections of the porous sheet before and after extraction of sodium chloride particles shows that the particle size, shape, and distribution of the sodium chloride particle determines the pore size, shape, and distribution. Density determinations made on the sheet before and after extraction confirm the above observation that the volume of the pores is approximately equal to the volume occupied by salt prior to extraction.

X-ray diffraction tests on the kerosene free structure reveals an oriented structure by X-ray diffraction in which lamellae are molecularly oriented at a minimum to maximum axial orientation ratio of 0.85 in the plane parallel to the faces of the structure and 0.64 in the plane normal to said faces. After sintering and leaching free of salt, the orientation ratio parallel to the faces of the structure is 0.80 and 0.63 in the plane normal to the said faces.

b. The sheet is wrapped around a 1-inch diameter metal mandrel to produce a tubular layered structure approximately one-fourth inch in wall thickness. The assembly is then preheated gently to remove kerosene and then inserted into a snuggly fitting metal pipe and heat-treated so that the slip-formed shape is at 380° C. for 30 minutes and then cooled to room temperature. The tubular structure is removed from the pipe, slipped off the mandrel and leached free of salt. The resulting porous tubular structure has properties similar to the sheet described in (a).

c. The sheet is placed over a vented hemispherical cavity and conformed to the cavity under fluid pressure applied through a rubber dam. The pressure is applied several times to substantially eliminate elastic recovery. The molded preform is dried and free-sintered to provide a flawless hemisphere. The hemisphere is leached in water until free of salt. The salt-free article has properties similar to those in (a).

d. The sheet is laid over a 5 inch square of 16 × 20 mesh screen woven of 0.025 inch diameter wire and rolled into the interstices thereof. Upon drying, heat-treating, and leaching, a porous, reinforced article is obtained.

e. A nonheat-treated sheet is rolled into a cylinder 2 inches in diameter and 8 inches long. The rolled structure is heated gently to remove kerosene and then inserted into a snuggly fitting metal pipe approximately 2 inches in diameter and sintered so that the entire slip-formed shape is at 380° C. for 30 minutes and then cooled to room temperature. The resulting cylindrical structure is removed from the pipe and leached free of salt. The resulting porous structure has properties similar to the sheet described in a.

EXAMPLE VI

A pressure-coalescible sheet is prepared by the procedure of example v, except that the successive doubling, rotating, and calendering out steps are repeated a total of eight times. On rapid heating of the sheet to 380° C., without previous drying to remove kerosene, the sheet delaminates into lamellae roughly 8 microns thick. On a sheet identically prepared except that the solids contain 2 percent of finely powdered carbon black, 0.05 micron average particle size, microscopic examination of frozen microtomed cross sections of the sheet at 400 diameters magnification show the lamellae to be discrete, about 5 to 8 microns thick with lateral dimensions at least several orders of magnitude as large, disposed in planes parallel to the surface of the sheet, there being no visible spheroidal aggregates. Examination of the same cross sections under the electron microscope at 10,000 diameters magnification show that the ultimate spheroidal shaped colloidal polytetrafluoroethylene resin particles, averaging 0.1 to 0.3 microns in diameter, are uniformly packed in almost uniform propinquity.

EXAMPLE VII

Two pressure-coalescible sheets are prepared by the procedures of example V, except that the successive doubling, rotating and calendering out steps are repeated a total of eight times on the first sheet and a total of 14 times in the second. After drying, and leaching the tensile strength at break in length and width direction for the first porous sheet is about 400 p.s.i. and the tensile strength of the second about 1,100 p.s.i. The elongation at break of the first sheet is 200 percent and the elongation of the second is about 100 percent.

EXAMPLE VIII

Three pressure-coalescible compositions are prepared by the procedure of example V except that the initial slurry of the first contains 60 volumes of powdered sodium chloride, 8 volumes of a white free-flowing colloidal alumina consisting of clusters of minute fibrils of boehmite (AlOOH) alumina, 32 volumes of commercial polytetrafluoroethylene resin fine powder and 600 volumes of kerosene. The initial slurry for the second contains 60 volumes of powdered sodium chloride, 16 volumes of colloidal alumina and 24 volumes of commercial polytetrafluoroethylene resin fine powder and 600 volumes of kerosene. The initial slurry of the third contains 60 volumes of powdered sodium chloride, 24 volumes of colloidal alumina and 16 volumes of commercial polytetrafluoroethylene resin fine powder and 600 volumes of kerosene. Each of the compositions is slip-formed into a 45 mil thick sheet by the procedure of example V except that the successive layering, rotating and calendering steps are repeated a total of eight times. The sheets are dried free of kerosene, heat-treated, cooled and leached free of salt. The tensile properties of the three porous structures filled with alumina containing 60 percent pores by volume are listed below:

| Sheet No. | Percent by volume of alumina with respect to polytetrafluoroethylene | Ultimate tensile strength, lb./sq. inch | Ultimate elongation, percent |
| --- | --- | --- | --- |
| 1 | 20 | 1,180 | 182 |
| 2 | 40 | 425 | 110 |
| 3 | 60 | 102 | 55 |

Microscopic examination of the filled porous structure shows that it is free of salt.

EXAMPLE IX

Four volumes of commercial polytetrafluoroethylene resin fine powder comprising discrete spheroidal aggregates averaging about 300 microns in diameter and 6 volumes of hydrated borax ($Na_2B_4O_7 \cdot 10 H_2O$ having an average particle diameter of 5 to 10 microns, is slurried in 10 times its displacement volume of refined kerosene, and subjected to cutting at room temperature for 1 minute with a bladed rotary cutter, the blades operating at a peripheral speed of about 2,000 feet per minute to reduce the average size of the polytetrafluoroethylene aggregates to about 10 microns and the average size of the borax to about 1 to 5 microns. The cut slurry is then processed to a pressure-coalescible filter cake and calendered to a sheet as described in example V. The sheet is gently heated to remove kerosene and free-sintered by heating for 20 minutes at 380° C. and cooled in air to room temperatures. The sheet after heat treating has expanded 3.9 times its original volume, increasing in both area and thickness. Microscopic examination of sections of the sheet show that it is porous and contains dehydrated borax. The dehydrated borax is readily leached from the expanded sheet by repeated immersion and washing of the sheet in water. After washing, the dried porous, planar-oriented structure occupies 2.2 times its original volume. The sheet has a density of 0.345 gram per cubic centimeter of 21.5 pounds per cubic foot and has a smooth, delicate texture.

The above planar-oriented sheet has a tensile strength at break of 275 p.s.i. and an elongation of 104 percent at break in both the length and width dimensions. Air permeability tests on the porous planar-oriented structure show permeabilities of 2.3 cubic feet a minute per cubic foot at a pressure of 0.1 p.s.i.g. pressure and 13.0 cubic feet a minute per cubic foot at a pressure of 5.0 p.s.i.g. pressure.

EXAMPLE X

A pressure-coalescible sheet is prepared by the procedure of example IX except that the initial slurry contains 2 volumes of a commercial polytetrafluoroethylene resin fine powder and 8 volumes of hydrated borax. After gently heating to remove kerosene, the sheet is heat-treated 20 minutes at 380° C. Heat treating causes the sheet to expand 2.8 times its original volume while both the area and thickness of the sheet increase. The dehydrated borax is leached from the sheet by repeated immersion and washing. When the borax is completely removed and the sheet is dried, it has expanded 2.1 times its original volume. The porous sheet has a density of 0.263 grams per cubic centimeter or 16.4 pounds per cubic foot. The sheet has an exceptionally smooth texture and the feel of a fine chamois.

Air permeability tests on the above-showed permeabilities of 3.6 cubic feet a minute per square foot at 0.1 p.s.i.g. pressure and 18.6 cubic feet a minute per square foot at 5 p.s.i.g. pressure. The sheet had a tensile strength at break of about 190 p.s.i.g. and an elongation at break of 125 percent.

EXAMPLE XI

A pressure-coalescible composition is prepared by the process of example V, except that the initial slurry comprises 4 volumes of a commercial polytetrafluoroethylene resin fine powder and 6 volumes of a poly(methyl methacrylate) powder (the average particle size of which is 100 microns, having an inherent viscosity of 0.435 and a weight average molecular weight of 1,000,000) in 10 parts of kerosene.

After drying and heat treating for 1 hour at 380° C., the poly(methyl methacrylate) is completely depolymerized and volatilized leaving a porous structure as revealed by microscopic examination.

EXAMPLE XII

Sixty grams of a commercial polytetrafluoroethylene resin fine powder comprising discrete spheroidal aggregates averaging 300 microns in diameter and 40 grams of silica particles ranging in diameter from 0.5 to 3.0 microns composed of submicroscopic fibers of silica 250 to 35 A. in diameter spaced roughly 300 A. apart, arranged similar to fibers in cotton batting (internal porosity 94 percent having a specific surface of the order of 175 square meters per gram) is slurried in 600 cc. of refined kerosene, and subjected to cutting at room temperature for 1 minute with a bladed rotary cutter, the blades operating at a peripheral speed of about 2,000 feet per minute to reduce the average size of the polytetrafluoroethylene aggregates to about 10 microns, while the average size of the silica particles is substantially unchanged.

A pressure-coalescible composition is prepared from the slurry and calendered by the procedure of example V. The sheet containing kerosene has an elastic and somewhat rubbery feel. The kerosene is removed by gentle heating and the dried sheet is heat-treated free for 15 minutes at 380°C. and cooled to room temperatures temperature. The sheet already is porous containing 73.5 percent voids with a density of 0.575 g./cc. The planar-oriented, silica-filled porous sheet has a tensile strength at break of about 190 p.s.i. and an elongation at break of about 70 percent.

EXAMPLE XIII

A pressure-coalescible sheet is prepared by the procedure of example XII except that the slurry contains 5 grams of the silica and 90 grams of polytetrafluoroethylene resin in 600 cc. of kerosene. The heat-treated sheet has a density of 2.01 g./cc. and a void volume of 7.9 percent. The tensile strength at break in both the length and width direction is about 3,750 p.s.i. and the elongation is about 375 percent at break.

EXAMPLE XIV

A porous, planar-oriented structure is prepared by the procedure of example V except that the soluble salt is potassium chloride, average particle size about 35 microns in diameter.

EXAMPLE XV

A porous, planar-oriented structure is prepared by the procedure of example V except that the soluble salt is sodium sulfate, average particle size about 40 microns in diameter.

EXAMPLE XVI

A porous, planar-oriented structure is prepared by the procedure of example XI except that the volatile material is ammonium bicarbonate, particle size about 30 microns in diameter.

EXAMPLE XVII

A porous planar-oriented structure is prepared by the procedure of example V except that the removable material is $CaCO_3$, roughly 30 microns in diameter, and is removed by reacting with HCl and washed with water.

EXAMPLE XVIII

A pressure-coalescible sheet is prepared by the procedure of example XII except that the slurrying medium is a dielectric transformer oil. The sheet is not processed further but is employed as a corona-resistant barrier and spacer in a high voltage cable construction or as a spacer in a high voltage transformer.

EXAMPLE XIX

A porous structure is made according to the procedure of example XII and the finished product is impregnated with transformer oil or other oil with good resistance to dielectric break down and employed as a corona resistant spacer for high voltage cable and as a spacer in high voltage transformers.

EXAMPLE XX

A pressure-coalescible sheet is prepared according to the procedure of example V except that initial slurry contains 80 volumes of the specified sodium chloride powder, 10 volumes of finely-divided graphite, average particle diameter 40 microns, and 10 volumes of a commercial polytetrafluoroethylene resin and 400 volumes of purified kerosene. The sheet is gently heated to remove kerosene and then leached free of sodium chloride as indicated by the tests mentioned in the cited example. The sheet may be dried, heat-treated, and leached as described in example V.

EXAMPLE XXI

Two pressure-coalescible sheets are prepared by the procedure of example V except the initial slurry of each sheet contains 80 volumes of powdered sodium chloride, 4 volumes of graphite, 16 volumes of a commercial polytetrafluoroethylene resin fine powder, and 400 volumes of refined kerosene. In addition, the successive doubling, rotating and calendering steps are repeated a total of 8 times on the first sheet and a total of 12 times on the second. After drying, heat treating, and leaching the tensile strength at break in length and width for the first porous sheet is about 580 p.s.i. and about 1,040 p.s.i. for the second sheet. The elongation at break of the first sheet is about 145 percent and about 110 percent for the second.

EXAMPLE XXII

A reinforced, porous, planar-oriented structure is prepared by the procedure of example V except that the polytetrafluoroethylene composition contains one part by volume of sintered polytetrafluoroethylene resin fibers, roughly one-sixteenth of an inch long having an average diameter of roughly 12 microns, and 4 parts by volume of commercially available polytetrafluoroethylene resin fine powder. The tensile strength at break is 700 p.s.i. and the elongation at break about 160 percent.

EXAMPLE XXIII

A reinforced, porous, planar-oriented structure is prepared by the procedure of example XXII except that the reinforcing fiber is a polyamide fiber one-sixteenth inch long and averages roughly 6 microns in diameter. The tensile strength at break of the reinforced sheet is about 600 p.s.i. and the elongation at break is about 160 percent.

EXAMPLE XXIV

A reinforced, porous, planar-oriented structure is prepared by the procedure of example XXII except that the reinforcing fiber is a fibrous, granular polytetrafluoroethylene resin comprising fibers roughly 10 to 30 microns in average length with a diameter of roughly 1 to 6 microns.

EXAMPLE XXV

A reinforced, porous, planar-oriented structure is prepared by the procedure of example XXII except that the reinforcing fiber is a staple polyimide fiber.

EXAMPLE XXVI

A heat-resistant, porous, planar-oriented structure is prepared by the procedure of example XIII except that the fibrous filler is potassium titanate microfiber.

EXAMPLE XXVII

A porous composite laminate consisting of a layer of porous polytetrafluoroethylene resin, a layer of polytetrafluoroethylene resin containing 20 percent by volume of polyimide staple and a layer of polytetrafluoroethylene containing 20 percent by volume of fibrous potassium titanate was prepared by the following procedure:

Three separate pressure-coalescible sheets were prepared as follows:

a. 10 volumes of commercial polytetrafluoroethylene resin fine powder, 40 volumes of powdered sodium chloride having a 50 mesh standard sieve, and 500 volumes of refined kerosene are subjected to cutting at room temperature for 1 minute with a bladed rotary cutter. The resultant slurry containing discrete aggregates of polytetrafluoroethylene resin about 10 microns in diameter and sodium chloride powder is filtered to form a cake and rolled, laminated and rerolled at 90°, repeating the washing process six times substantially as set forth in example V to form a sheet 45 mils in thickness.

b. 8 volumes of commercial polytetrafluoroethylene fine powder, 2 volumes of fibrous potassium titanate, 40 volumes of sodium chloride having a 50 mesh standard sieve are cut with a bladed rotary cutter with 500 volumes of refined kerosene, filtered, and the filter cake washed as in example XXVII (a.).

c. The procedure of example XXVII (b.) is repeated except that the fibrous potassium titanate is replaced by a polyimide fiber staple.

The three sheets are carefully laid to form a laminate which is then passed through the calendar rolls set at 90 mils. The resultant structure is rotated in its plane 90°, then passed through the calender rolls set at 45 mils to give a coherent, three-component, composite laminate.

The laminate is then dried and heat-treated at 360° C. for 30 minutes. After heat treating, the sodium chloride is washed from the laminate by immersion in running water until no chloride can be detected in the wash water with silver nitrate.

Sections of the composite showed three distinct porous layers well fused together. The layers could not be separated by peeling.

EXAMPLE XXVIII

A two-layer composite laminate consisting of a porous layer of polytetrafluoroethylene and a nonporous layer of polytetrafluoroethylene is prepared by making a slip-formed sheet containing 60 percent by volume of total solids of sodium chloride following the procedure of example V and a nonporous slip-formed sheet by taking 2½ times the volume of resin employed in the first sheet forming a pressure-coalescible composition by cutting with kerosene and slip-forming to a 45 mil sheet as in example V, except that the sodium chloride is omitted.

The sheet containing sodium chloride and the second sheet are laid congruently together with the last axes of calendering coinciding. The composite is then calendered to give a 45 mil sheet, which is dried, heat-treated at 380° C. for 10 minutes, and washed with water until no further sodium chloride can be detected in the wash water.

The resultant laminate is then sectioned and examined under the microscope. The two layers may be readily distinguished but are evidently welded together to a coherent structure.

EXAMPLE XXIX

A planar-oriented, porous structure is prepared according to the procedure of example V except that an insoluble, fine abrasive, jeweler's rouge, is added comprising about 50 percent of the volume occupied by the polytetrafluoroethylene polymer. The finished product is a soft, porous structure containing uniformly distributed abrasive, which is flexible. Optical and metal objects were successfully polished with this sheet, the sheet readily conforming closely to the working surface without scratching it.

I claim:

1. A sheet comprising per 100 parts by volume 0—39 parts liquid capable of wetting polytetrafluoroethylene and 61-—100 parts complementally of solid material comprising 5-—100 volume percent polytetrafluoroethylene resin and 0-—95 volume percent complementally of particulate solid filler, said sheet having a volume shrinkage of less than 39 percent on drying and heat-treating, further characterized in that the polytetrafluoroethylene resin is present substantially entirely in the form of discrete lamellae less than 10 microns thick, which lamellae are molecularly oriented parallel to the faces of said structure and have a molecular orientation as determined by an A X-ray ratio of from 1 to 0.4 and a B X-ray ratio of from 0.7 to 0.05.

2. The sheet of claim 1 in which the lamellae are molecularly oriented at minimum to maximum axial orientation ratios of at least 0.4 in the plane parallel to the faces of said sheet, and less than 0.7 in the plane normal to said faces.

3. The sheet of claim 2 in tubular form.

4. The sheet of claim 1 in laminar form.

5. The sheet of claim 4 in which the solid material comprises 20—95 volume percent particulate solid filler.

6. A substantially void-free, thermally form-stable tetrafluoroethylene resin sheet having a tensile strength of at least 5,000 p.s.i. in at least two mutually perpendicular directions as measurer measured via ASTM-D 1457-56T.

7. The sheet of claim 6 in the form of tubing.

8. An article of manufacture comprising a plurality of superposed preformed porous layers of polytetrafluoroethylene resin having from 5 percent to 95 percent by volume of voids, said polytetrafluoroethylene resin having molecular orientation as determined by an A X-ray ratio of from 1 to 0.4 and a B X-ray ratio of from 0.7 to 0.05.

9. An article of manufacture comprising a plurality of superposed preformed porous layers of polytetrafluoroethylene resin having at least 5 percent by volume of voids and containing a solid particulate filler, the sum of the volume of voids and the volume of filler being less than 95 percent of the total volume, said polytetrafluoroethylene resin having molecular orientation as determined by an A X-ray ratio of from 1 to 0.4 and a B X-ray ratio of from 0.7 to 0.05.

10. Article of claim 8 further characterized by a tensile strength based on original dimensions which when divided by the volume fraction of polytetrafluoroethylene resin present in said article, exceeds 5,000 p.s.i.

11. Article of claim 9 further characterized by a tensile strength based on original dimensions which, when divided by the volume fraction of polytetrafluoroethylene resin present in said article, exceeds 5,000 p.s.i.

12. Article of claim 9 in which said filler comprises boehmite alumina.

13. Article of claim 9 in which said filler comprises alumina.

14. Article of claim 9 in which said filler comprises graphite.

15. Article of claim 9 in which said filler comprises fibrous potassium titanate.

16. Article of claim 9 in which said filler comprises a synthetic organic resin.

17. Process for the manufacture of a porous sheet of polytetrafluoroethylene resin which comprises forming a pressure-coalescible composition comprising a removable particulate filler having a particle size of at least 20 microns and porous aggregates of polytetrafluoroethylene colloidal particles, and a liquid lubricant capable of wetting the polytetrafluoroethylene resin, the volume of said polytetrafluoroethylene resin being from 5 percent to 95 percent of the total solids volume, sequentially working said composition in a slip-formable condition by the concurrent application of a compressive stress and a shear stress which is perpendicular to the said compressive stress, the shear stresses in successive steps being distributed substantially biaxially about said compressive stress, continuing said working until the resultant sheet exhibits an A X-ray ratio of from 1 to 0.4 and a B X-ray ratio of from 0.7 to 0.1, and thereafter removing said removable filler.

18. A process according to claim 17 which additionally comprises drying the resulting sheet and heat treating the dried sheet at a temperature in the range of 360 to 390° C. for 10 to 30 minutes.

19. Process of claim 17 in which said removable filler is sodium chloride.

20. Process of claim 17 in which said removable filler is calcium carbonate.

21. Process of claim 17 in which said pressure-coalescible composition additionally comprises a nonremovable filler.

22. Process of claim 21 in which said particulate filler is poly(methyl methacrylate).

23. Process for the manufacture of porous sheet of polytetrafluoroethylene resin which comprises forming a pressure-coalescible composition comprising porous aggregates of polytetrafluoroethylene resin as 5—95 percent of the solids volume a particulate filler having a vaporizable component, and a liquid lubricant capable of wetting said aggregates polytetrafluoroethylene resin, sequentially working said composition in a slip-formable condition by the concurrent application of a compressive stress and a shear stress which is perpendicular to said compressive stress, the shear stresses in successive steps being distributed substantially biaxially about said compressive stress, continuing said working until the resultant sheet exhibits an A X-ray ratio of from 1 to 0.4 and a B X-ray ratio of from 0.7 to 0.1, removing said liquid lubricant, and thereafter heating to a temperature sufficient to volatilize said vaporizable component.

24. Process of claim 23 in which the greater part of said filler has a particle size less than 20 microns.

25. Process of claim 24 in which said filler is borax.

26. A method of preparing microporous polytetrafluoroethylene resin sheets including the steps of mixing a major amount of finely divided tetrafluoroethylene resin powder in a Stoddard solvent carrier with a minor amount of colloidal boehmite alumina, filtering the mixture to form a dough, rolling the dough into a strip to uniform thickness, folding the strip upon itself, reorienting the same through 90°, rerolling the strip, repeating the first folding and reorienting steps a plurality of times, then reducing the thickness of the strip by rolling, reorienting the dough strip of reduced thickness 90° and further reducing the strip in thickness after reorientation, continuing the progressive rolling to reduced thickness and second reorienting steps a plurality of times, drying the strip of reduced thickness at a temperature above the dry point of the Stoddard solvent carrier to remove the same, sintering the dried strip at a temperature of about 725° F., leaching the particles of boehmite alumina from the dried strip with a solution of hydrochloric acid, washing the strip and drying it to produce the desired microporous polytetrafluoroethylene resin sheets.

27. A method of preparing microporous polytetrafluoroethylene resin sheets including the steps of mixing finely divided polytetrafluoroethylene powder in a carrier liquid with removable finely divided particles, the weight of said finely divided particles being equal to or greater than the weight of the polytetrafluoroethylene, filtering the mixture to form a dough, rolling the dough into a strip to uniform thickness, folding the strip upon itself, reorienting the same through 90° and rerolling the strip, repeating the first folding and reorienting steps a plurality of times, then reducing the thickness of the strip by rolling, reorienting the strip of reduced thickness 90° and further reducing the strip in thickness after reorientation, continuing the progressive rolling to reduced thickness and second reorienting steps a plurality of times, drying the strip of reduced thickness to remove the carrier, sintering the dried strip at a temperature above the melting point of the polytetrafluoroethylene, leaching the finely divided particles from the sintered strip, washing the strip and drying it to produce the desired microporous polytetrafluoroethylene resin sheet.

28. A method of preparing microporous polytetrafluoroethylene resin sheets including the steps of mixing finely divided polytetrafluoroethylene resin powder in a carrier liquid with removable finely divided particles, filtering the mixture to form a dough, rolling the dough into a strip to uniform thickness, folding the strip upon itself, reorienting the same through 90° and rerolling the strip, repeating the first folding and reorienting steps a plurality of times, then reducing the thickness of the strip by rolling, reorienting the strip of reduced thickness 90° and further reducing the strip in thickness after reorientation, continuing the progressive rolling to reduced thickness and second reorienting steps a plurality of times, drying the strip of reduced thickness to remove the carrier, sintering the dried strip at a temperature above the melting point of polytetrafluoroethylene resin, leaching the finely divided particles from the sintered strip, washing the strip and drying it to produce the desired microporous polytetrafluoroethylene resin sheet.

29. A method of preparing microporous polytetrafluoroethylene resin sheets including the steps of mixing finely divided polytetrafluoroethylene resin powder in a carrier liquid with removable finely divided particles, filtering the mixture to form a dough, rolling the dough into a strip to uniform thickness, folding the strip upon itself, reorienting the same and rerolling the strip, repeating the first folding and reorienting steps a plurality of times, then reducing the thickness of the strip by rolling, reorienting the strip of reduced thickness and further reducing the strip in thickness after reorientation, continuing the progressive rolling to reduced thickness and second reorienting steps a plurality of times, drying the strip of reduced thickness to remove the carrier, sintering the dried strip at a temperature above the melting point of polytetrafluoroethylene resin, leaching the finely divided particles from the sintered strip, washing the strip and drying it to produce the desired microporous polytetrafluoroethylene resin sheet.

30. A method of preparing microporous polytetrafluoroethylene resin sheets including the steps of forming a dough of finely divided polytetrafluoroethylene resin powder in a carrier liquid with removable finely divided particles, rolling the dough into a strip, reorienting the rolled strip and rerolling the same, repeating the rolling and reorienting steps a plurality of times, drying the strip to remove the carrier, sintering the dried strip at a temperature above the melting point of polytetrafluoroethylene resin, leaching the finely divided particles from the sintered strip, washing the strip and then drying it to produce the desired microporous polytetrafluoroethylene resin sheet.

31. A method of preparing microporous polytetrafluoroethylene resin sheets including the steps of mixing finely divided tetrafluoroethylene resin powder in a carrier liquid with removable finely divided particles, filtering the mixture to form a dough, rolling the dough into a strip, reorienting the rolled strip and rerolling the same, repeating the rolling and reorienting steps a plurality of times, drying the strip to remove the carrier, sintering the dried strip at a temperature above the melting point of polytetrafluoroethylene resin, leaching the finely divided particles from the sintered strip, washing the strip and then drying it to produce the desired microporous polytetrafluoroethylene resin sheet.

32. A method of preparing microporous polytetrafluoroethylene resin sheets including the steps of mixing finely divided polytetrafluoroethylene resin powder in a carrier liquid with removable finely divided particles, filtering the mixture to form a dough, rolling the dough into a strip, reorienting the rolled strip, rerolling the reoriented strip, repeating the rolling, reorienting and rerolling steps a plurality of times, drying the strip, removing the finely divided particles from the strip, sintering the strip at a temperature above the melting point of polytetrafluoroethylene, washing the strip and then drying it to produce the desired microporous polytetrafluoroethylene resin sheet.

33. A method of preparing porous polytetrafluoroethylene resin sheets including the steps of forming a pressure coalescible composition of finely divided polytetrafluoroethylene resin powder in a carrier liquid with removable finely divided particles, rolling said composition into a strip, reorienting the rolled strip and rerolling the same, repeating the rolling and reorienting steps a plurality of times, drying the strip to remove the carrier, sintering the dried strip at a temperature above the melting point of polytetrafluoroethylene resin, leaching the finely divided particles from the sintered strip, washing the strip and then drying it to produce the desired porous polytetrafluoroethylene resin sheet.

34. A method according to claim 33 wherein said carrier liquid is a hydrocarbon liquid capable of wetting the polytetrafluoroethylene.